United States Patent [19]

Cabalfin

[11] 4,318,170
[45] Mar. 2, 1982

[54] POWER INVERTER OSCILLATOR CIRCUIT

[76] Inventor: Rolando V. Cabalfin, 7321 El Domino Way #2, Buena Park, Calif. 90620

[21] Appl. No.: 224,386

[22] Filed: Jan. 12, 1981

[51] Int. Cl.³ .......................................... H02M 7/537
[52] U.S. Cl. .................................... 363/133; 363/22; 315/DIG. 5; 331/113 A; 331/108 A
[58] Field of Search .................. 363/22, 23, 131, 133; 331/108 A, 110, 113 A, 114, 168; 315/DIG. 2, DIG. 5, 219

[56] References Cited

U.S. PATENT DOCUMENTS

| | | | |
|---|---|---|---|
| 3,008,068 | 11/1961 | Wilting et al. | 363/133 X |
| 3,602,839 | 8/1971 | Williams | 363/131 X |
| 3,662,249 | 5/1972 | Wijsboom | 363/133 |
| 3,703,677 | 11/1972 | Farrow | 363/131 |
| 3,818,312 | 6/1974 | Luursema et al. | 363/133 |
| 4,194,238 | 3/1980 | Masaki | 363/132 X |

Primary Examiner—William M. Shoop
Assistant Examiner—Peter S. Wong
Attorney, Agent, or Firm—Dominick Nardelli

[57] ABSTRACT

A power inverter oscillator circuit has an output transformer with a primary winding, coupled in parallel with a capacitor, and the opposite ends of which are connected to the respective emitters of a PNP and a NPN transistors. The collector of the NPN transistor is coupled to the positive terminal and the collector of the PNP transistor is coupled to a negative terminal. In addition, a switching transformer is provided having a primary coil coupled at one end to one terminal and at the other end to the emitter of the transistor which is coupled to the other terminal. The switching transformer has two secondary coils or windings wherein one of the secondary coils is coupled between one terminal and the base of the transistor whose collector is coupled to the other terminal and the other secondary coil is coupled between the base of the other transistor and the remaining terminal.

3 Claims, 1 Drawing Figure

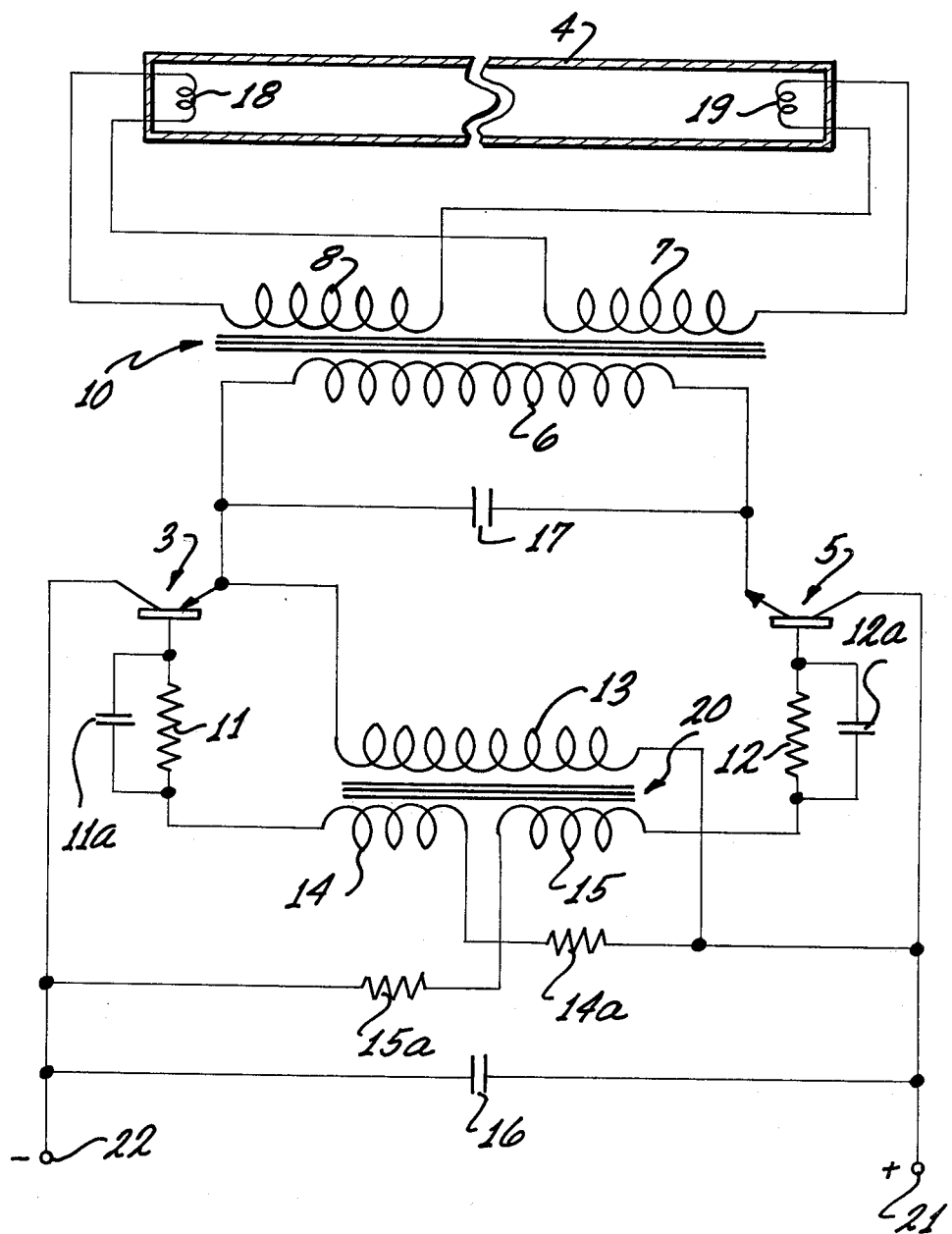

POWER INVERTER OSCILLATOR CIRCUIT

FIELD OF THE INVENTION

This invention relates to a DC to AC inverter circuit for efficiently converting direct current to alternating current for a variety of applications, one of which is the energizing of fluorescent tube lighting units.

BACKGROUND OF THE INVENTION

In the past many types of DC to AC inverter circuits were devised, most of which operated under the same principle of operation. The prior art circuits used a transformer wherein the primary winding has a center tap connected to either a negative or positive terminal and the ends of the winding were grounded through transistors which were alternately turned on and off by a standard means. However, these prior art inverter circuits were found to be somewhat inefficient because power was lost every time the transformer reversed its magnetic field.

OBJECT OF THE INVENTION

It is an object of this invention to provide a more efficient DC to AC inverter circuit.

Another object of this invention is to provide a transformer with a primary coil in parallel with capacitor wherein energy is stored in a capacitor whenever the current in the primary coil is interrupted.

These and other objects and features of advantages will become more apparent after one studies the following detailed description of the preferred embodiment of the invention together with the appended drawing.

BRIEF DESCRIPTION OF THE DRAWING

The sole FIGURE is an illustration of a schematic circuit showing the preferred embodiment of my invention as it would be used to energize a fluorescent tube.

DETAILED DESCRIPTION OF THE DRAWING

The circuit shown has two terminals 21 and 22. Terminal 21 has a positive potential with respect to terminal 22. In series across the terminal, one finds a NPN transistor 5 and a primary coil 6 of an output transformer 10, and a PNP transistor 3. One observes, due to the polarity, the collector of transistor 5 is connected to terminal 21 and the collector of transistor 3 is connected to terminal 22. In parallel with the primary coil 6 is a capacitor 17, to form an oscillating or tank circuit.

In addition, the circuit has a switching transformer 20 whose primary coil 13 is connected between one of the terminals and the emitter of the transistor coupled to the other terminal, for example, since transistor 3 is a PNP type, one end of the coil 13 is connected to its emitter and the other end of coil 13 is connected to terminal 21.

The base of transistor 3 is coupled to terminal 21 through an isolating resistor 11, a secondary coil 14 of transformer 20, and another resistor 14a. The base of transistor 5 is similarly coupled to the other terminal 22 through another isolating resistor 12 and secondary coil 15 of transformer 20 and another resistor 15a.

Since the circuit has utility to energize flourescent tubes, a typical tube 4 is shown having its respective filaments 18 and 19 connected to secondary coils 7 and 8 of transformer 10 as shown in the drawing. This portion of the circuit is taught in a U.S. Pat. No. 3449 granted by the Republic of the Philippines on Mar. 8, 1979, and it will be briefly described herein. As taught in the patent, the ratio of turns between coils 7 and 8 is 15 to 16 so that during start up a low voltage current warms up each filament 18 and 19 until ionazation is effected. Then the voltage across each coil 7 and 8 maintains the arc.

OPERATION OF THE DEVICE

When an electromotive force is applied to the terminals 21 and 22 as shown, at first both transistors are non-conductive. The base of transistor 3 will now have a positive potential because it is coupled to terminal 21 and its emitter will also have a positive potential while its collector will have a negative potential. Therefore, transistor 3 will conduct first before transistor 5 even though the base of transistor 5 is biased negative with respect to its collector since there is no negative bias on the emitter of transistor 5.

After transistor 3 conducts current, the emitter of transistor 5 is bias negatively so that it now conducts. In the meantime, because transistor 3 has been switched on, the change in current in primary coil 13 produces an emf in both secondary coils 14 and 15 to cause transistor 3 to cut off. This causes current in both the primary coil 6 and 13 to cut off whereby the collapsing magnetic field in transformer 20 causes transistor 5 to stop conducting. Of courst an AC is induced in secondary coils 7 and 8 to operate the tube 4.

Now that both transistors 3 and 5 are cut off and the negative magnetic field in transformer 20 drops to zero, transistor 3 starts conducting and the process is repeated. I have discovered that any energy induced in primary coil 6 after both transistors are cut off because of the collapsing magnetic field in transformer 10 is stored in capacitor 17 to be used again. Capacitor 11a is shunted across resistor 11 and capacitor 12a is shunted across resistor 12 for obvious reasons. Capacitor 16 is used to smooth out any changes in line voltage. One understands that terminals 21 and 22 can be coupled to the output terminals of a rectifying bridge circuit.

Having described the preferred embodiment of my invention one skilled in the art could, after studying the above description could devise other embodiments without departing from the spirit of my invention. Therefore, my invention is not to be considered limited to the disclosed embodiment, but includes all embodiments falling within the scope of the appended claims.

I claim:
1. A DC to AC power inverter circuit comprising:
   a positive charged terminal and a negative charged terminal;
   a first transformer having a primary coil and a secondary coil;
   a capacitor coupled in parallel with said primary coil;
   a PNP transistor and a NPN transistor each having an emitter, a collector and a base;
   said both transistors and said primary coil form a series circuit coupled across said terminals;
   each one of said transistors being coupled to a respective end of said primary coil and said transistors being coupled to a respective one of said terminals to form a series circuit;
   a second transformer having a primary coil and a first and a second secondary coils;
   said first secondary coil being coupled between the base of said PNP transistor and said positive terminal;

said second secondary coil being coupled between the base of said NPN transistor and said negative terminal; and said primary coil of said second transformer being coupled between the emitter of one of the transistors and said terminal which is coupled to the other transistor.

2. The inverter circuit of claim one wherein:

the respective end of said primary coil of said first transformer being coupled to the emitter of one of said respective transistors;

said collector of said NPN transistor being coupled to said positive terminal;

said collector of said PNP transistor being coupled to said negative terminal;

said first secondary coil of said second transformer being coupled between the base of said PNP transistor and said positive terminal;

and said second secondary coil of said second transformer being coupled to the base of said NPN transistor and said negative terminal.

3. The inverter circuit of claim two wherein:

said primary coil of said second transformer being coupled between the emitter of said PNP transistor and said positive terminal.

* * * * *